United States Patent [19]
Boone et al.

[11] Patent Number: 5,101,270
[45] Date of Patent: Mar. 31, 1992

[54] METHOD AND APPARATUS FOR RADON TRANSFORMATION AND ANGULAR CORRELATION IN OPTICAL PROCESSORS

[75] Inventors: Bradley G. Boone; Oodaye B. Shukla, both of Columbia; Mark D. Bulla, Laurel, all of Md.

[73] Assignee: The Johns Hopkins University, Baltimore, Md.

[21] Appl. No.: 627,155

[22] Filed: Dec. 13, 1990

[51] Int. Cl.$^5$ ............................................. H04N 7/18
[52] U.S. Cl. ...................................... 358/93; 382/42; 395/137
[58] Field of Search .................... 358/93, 160; 382/42; 364/521

[56] References Cited
U.S. PATENT DOCUMENTS

| | | | |
|---|---|---|---|
| 4,462,046 | 7/1984 | Spight | 358/93 |
| 4,768,156 | 8/1988 | Whitehouse | 382/42 |

*Primary Examiner*—Howard W. Britton
*Attorney, Agent, or Firm*—Robert E. Archibald

[57] ABSTRACT

A method and electro-optical apparatus for generating the Radon transform and angular correlation of input images using optical signal processing techniques is disclosed. In the preferred embodiment, video feedback of raster scanned images is utilized to perform the Radon transform and angular correlation separately or in combination. The basic video feedback architecture implements angular rotation of the input image via successive passes through a video feedback loop in which the feedback focal plane array is rotated by a fixed amount relative to the input/feedback miniature display unit. Subsequently, the Radon transform is derived by using anamorphic output optics, which image the Radon transform onto a linear self-scanned detector array. By projecting the rotated feedback image through a two-dimensional spatial light modulator, such as a liquid crystal television having a transmittance proportional to the intensity pattern of the unrotated input image, angular correlation is obtained by focusing the output light from the spatial light modulator onto a single photodetector using a spherical lens.

20 Claims, 8 Drawing Sheets

METHOD AND APPARATUS FOR RADON TRANSFORMATION AND ANGULAR CORRELATION IN OPTICAL PROCESSORS

STATEMENT OF GOVERNMENTAL INTEREST

This invention was made with Government support under contract N00039-87-C-5301 awarded by the U.S. Navy Department. The Government has certain rights in this invention.

BACKGROUND OF THE INVENTION

The present invention relates generally to optical signal processing systems, and in particular to systems that extract features from optical images for pattern recognition. Pattern recognition using imaging sensors can be implemented by means of either feature extraction or image matching. Optical image correlators have been developed, for example, for updating inertial navigation systems, and optical image matching systems have also been developed for pattern recognition. Many different types of optical feature extractors for pattern recognition have also been investigated. Generally speaking, optical processing as described herein offers a fast and highly parallel method of feature extraction and correlation using the fundamental properties of wavefront multiplication, addition, rotation, splitting, and feedback. On the other hand, one of the key concerns in the design of optical feature extractors is that the features selected for pattern recognition should be invariant with respect to scale and rotation, which simple image correlators are particularly sensitive to in most cases. As will be described in more detail hereinafter, such sensitivity to rotation and scale can be obviated by using video feedback.

Despite the fundamental advantages of optics for processing images (optical Fourier transforms, high parallelism and interconnectivity), one of its technological disadvantages stems from the lack of good two-dimensional (2-D) spatial light modulators. As a result, optical processing has been restricted to a few applications where 2-D operations can be broken down into sequential one dimensional (1-D) operations (e.g. synthetic aperture radar), for which well-developed (1-D) acousto-optics and television (TV) raster signals are used. See, for example, D. Psaltis, "Acousto-Optic Processing of Two-Dimensional Signals", J. Opt. Soc. Am. 71 @ p. 198 (1981). Another strategy is to exploit the mathematical properties inherent in the Radon transform and, as will be shown, angular correlation. These operations are particularly useful when viewing objects in plan view that possess some degree of rotational symmetry and scenes with good signal-to-clutter ratio. A helpful treatise on the Radon transform is contained in S. R. Dean, "The Radon Transform", in Mathematical Analysis of Physical Systems, R. E. Mickens, ed., Van Nostrand Reinhold Co., N.Y., pp. 81-133 (1985). (Previous treatments of angular correlation are not known.)

Image forming systems such as synthetic aperture radar (SAR) typically form images in plan view within time spans on the order of one second, thus allowing frame-to-frame algorithms to be implemented at video frame rates. After the SAR image is formed, features can be extracted using video feedback at TV rates to support pattern recognition within the required SAR image formation time. If faster decision rates are required, as would be the case for TV-based parts inspection or TV-compatible infrared or millimeter-wave surveillance, multi-aperture micro-optical components can be employed to support feature extraction and pattern recognition (via the Radon transform and angular correlation) without video feedback. In either approach, one of the major requirements on the sensor is that it automatically track the desired object so that shift invariance is virtually insured.

Prior experience with digital image processing of SAR imagery of ships has shown that longitudinal range profile (i.e., Radon transform) -based classification is useful, but segmentation is required before feature extraction. Both are time consuming and complex. Extracting longitudinal range profiles (Radon slices), which are virtually the optimal 1-D information of ships, from 2-D SAR imagery is particularly attractive because the Fourier transform of range profiles is a well developed and useful technique for ship recognition. As will be described in detail hereinafter, the optical Radon transform architecture proposed in accordance with the present invention determines the Radon transform naturally using simple optics, and the selection of the desired (longitudinal) profile is enabled by the use of an angular correlation architecture, which obviates image segmentation. In such application, a liquid crystal television (LCTV) is used in a transmissive shadow casting mode for displaying a reference image in the angular correlation architecture. The Fourier transform of the resulting profile (Radon transform) can then be computed after selection by the angular correlator.

Optical realizations of the Radon transform have been implemented by a number of investigators. Both forward and inverse Radon transforms have been considered, inverse transforms being used for tomographic reconstruction. However, all of these techniques involve the use of rotating or translating objects, lenses, drums, slits or film. One of the simplest architectures used to create a Radon transform uses a mechanically driven image rotator with anamorphic optics and a 1-D output detector array to obtain successive slices of the Radon transform. See G. R. Gindi and A. F. Gmitro, "Optical Feature Extraction via the Radon Transform", Optical Eng. 23 @ p. 499 (1984). The image rotator could be a dove prism or fiberoptic (bundle) coupler. The problem with these mechanical rotation schemes is that they are bulky and generally less reliable than all-electronic/optical schemes. As will be described later, the use of video feedback in accordance with the present invention eliminates the need for mechanically rotating components.

In pattern recognition, a key processing step after sensing the information is feature extraction, and the Radon transform is an effective method for feature extraction using different types of sensors. Optical parts inspection is one application using television sensors; see, for example, M. J. Simpson, P. A. Ervin and M. A. Snyder, "Radon Transform Applications in Optical Inspection", Optical Eng. 27 @ p. 164 (1988). Other sensors of interest include SAR, infrared, and millimeter wave sensors for surveillance and target recognition (especially when they display plan views of the desired objects).

In the case of objects with a high degree of bilateral symmetry, a longitudinal slice of the object intensity distribution, at a particular orientation, yields the most structural information. To obtain this result digitally requires an algorithm that estimates boundaries of the object via segmentation, determines the orientation of the object (longitudinal axis) in the scene, collapses the object's intensity samples perpendicular to the longitudinal axis, and then samples the resulting profile along the longitudinal axis. Such an algorithm is complicated to implement digitally and is subject to errors in estimating object scale (e.g.: length) and orientation. Once the longitudinal profile is found, however, it can then be processed by Fourier transformation, etc. to obtain suitable features for classification. For objects with higher degrees of rotational symmetry, more Radon slices may be required for classification of the object. Thus, an important prerequisite for deriving the longitudinal Radon slice is determining the orientation and symmetry of the object.

A way in which the object orientation and symmetry can be decided, for a given input scene containing a long or symmetric object, is to perform angular correlation. This will allow determination of the Radon transform without detailed knowledge of the object boundaries via segmentation. Thus, by rotating a reference image with respect to the sensed image, the correlation will be maximized when the images are aligned at the angle ($\phi$), relative to the reference image axis of symmetry, corresponding to the longitudinal axis of the object. When this occurs, the Radon transform of the input (sensed) image should be taken. Recovery of the orientation angle, i.e., the angle required to bring the sensed image into alignment with the reference image is an important parameter in sensor vehicle guidance.

Normally, correlation for scene matching or target tracking is implemented by shifts in cartesian coordinates (x,y). Rotation in angle ($\phi$) about the optical axis, or shifts in scale are undesirable, since the correlation peak-to-sidelobe level would be degraded. Much prior work in optical image matching system development has been devoted to eliminating these scale and rotation errors or making processing schemes that are invariant with respect to them. See for example, U.S. Pat. No. 4,084,255 issued to Casasent and Psaltis. In contradistinction, an angular correlator uses angle shifts as the lag variable and is sensitive to cartesian coordinate offsets. It is not sensitive to scale because angular correlation can be performed without a separate reference image, i.e. it is an autocorrelation that can be normalized by the peak correlation value. A SAR system, however, is designed to generate images which should not display errors in scale by the very nature of the radar signal processing, and that should be shift invariant within limits set by slant-range and cross-range (Doppler) tracking accuracy. Optical, infrared or millimeter-wave image sensors also can be made to generate images under the control of a tracking system so that shift errors are minimized. Scale sensitivity again can be eliminated with angular correlation, as just described.

Optical feedback has been used to perform a number of functions including pattern recognition, temporal and nonlinear processing, iterative transformation algorithms, and all-optical numerical computing. Television-based processing, with its ability to handle 2-D signals, can be utilized in optical architectures involving feedback. Thus, Crutchfield in "Space-Time Dynamics in video Feedback", Physica 10D @ p. 229 (1984), has studied the properties of video feedback, characterizing it as a chaotic system under some conditions. In contrast, the use of video feedback as proposed in accordance with the present invention and as described hereinafter aims to eliminate these dynamic instabilities. This is accomplished by the simple but crucial expedient of uncoupling successive video frames, using an input video gate and feedback video frame delay.

A number of investigators have also studied the application of feedback in optical information processing. See, for example, "The Use of Feedback in Optical Information Processing" by J. Cederquist and S. H. Lee, Appl. Phys. 18 @ p. 311 (1979). Moreover, earlier research has demonstrated the feasibility of using video feedback, by means of a beamsplitter, to enable readout of the iterated images in the feedback loop, see G. Hausler and A. Lohmann, "Hybrid Image Processing with Feedback", Opt. Commun. 21 @ p. 365 (1977), while still other architectures have been investigated that were used for affine image transformations, see E. S. Nezhevenka and B. I Spektor, "Affine Pattern Transformation in Optical Systems with Feedback", Avtometriya, No. 6, pp. 14-18 (1976). In addition, as taught by E. Marom et al in "Pixel-by-Pixel Array Division by Optical Computing", Optics Lett. 10 @ p. 43 (1985), liquid crystal light valves have also been used in lieu of television systems in incoherent feedback systems. Finally, recent work has also been reported by A. E. T. Chiou and P. Yeh in "Scaling and Rotation of Optical Images Using A Ring Cavity", Appl. Optics 29 @ p. 1584 (1990) as relates to the scaling and rotation of optical images in a laser ring cavity. However, none of these investigations have reported any attempt to separate (i.e. gate and delay) successive video frames or to process outputs of the video feedback loop as proposed in accordance with the present invention, and as will be described in detail hereinafter.

SUMMARY OF THE PRESENT INVENTION

As noted previously, the present invention is directed generally at optical signal processing systems that extract features from optical images for pattern recognition purposes and, in particular, relates to a method and apparatus for generating the Radon transform and/or angular correlation of input images using video feedback and optical signal processing techniques.

A general object of the invention is thus to provide an improved method and apparatus for image processing.

Another object of the invention is to provide an electro-optical processor useful for image processing in video and radar systems, including feature extraction for pattern recognition.

Another object of the invention is to provide an improved electro-optical processor for performing the Radon transform and/or angular correlation of input images, using video feedback and obviating the need for moving parts.

Other objects, purposes and characteristic features of the present invention will be pointed out as the description of the invention progresses and will also be obvious from the accompanying drawings, wherein.

Figure 3A:
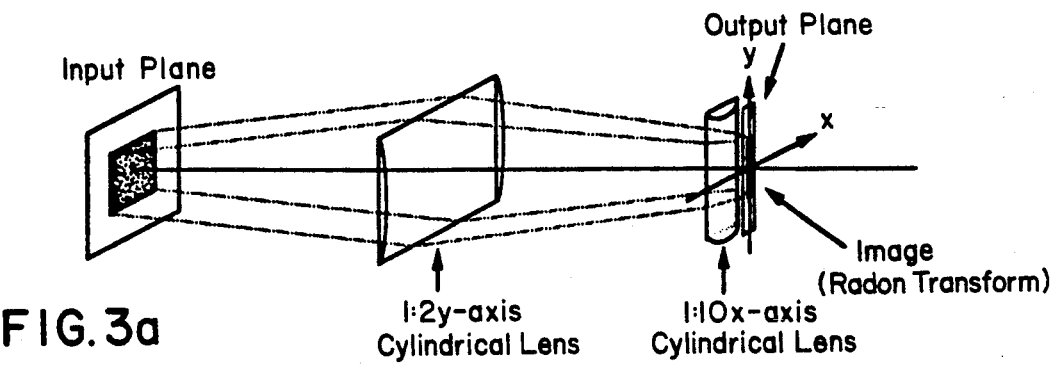
Figure 3B:
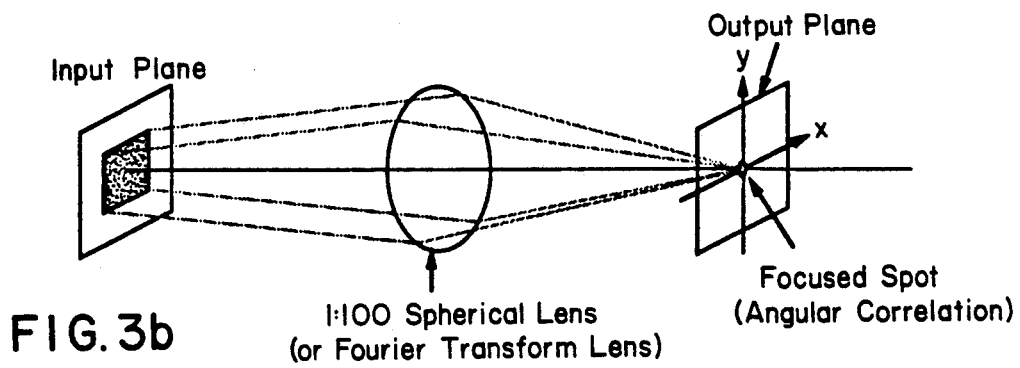
Figures 5A, 5B:
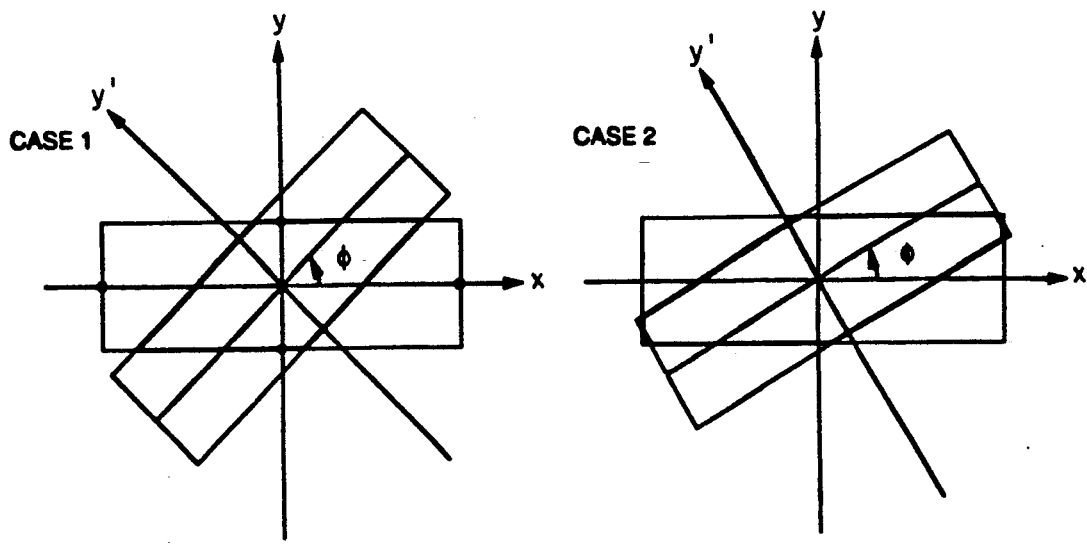
Figure 4A:
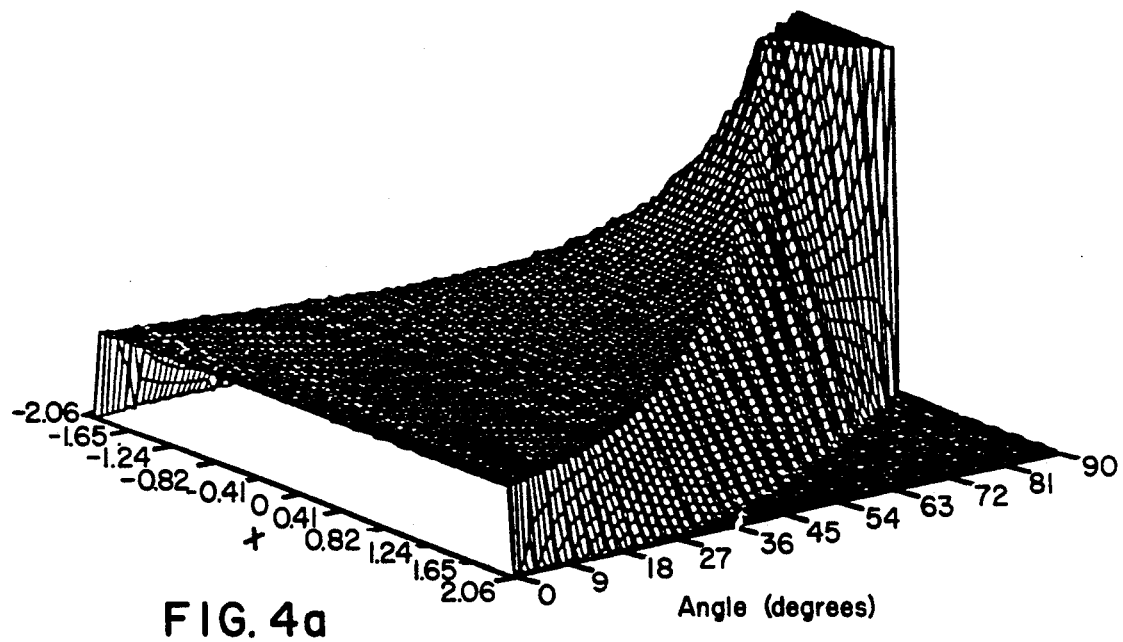
Figure 4B:
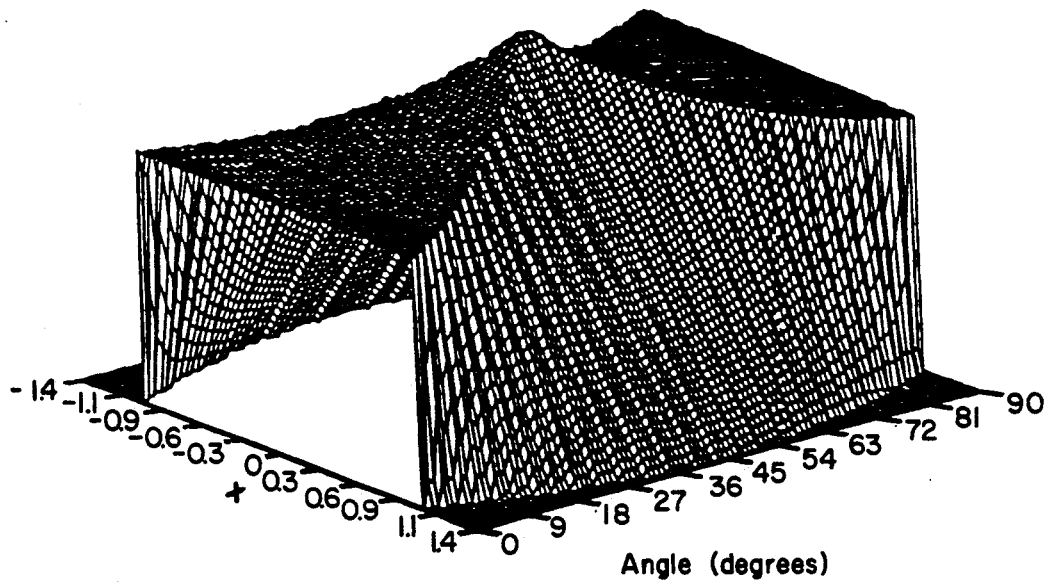
Figure 6:
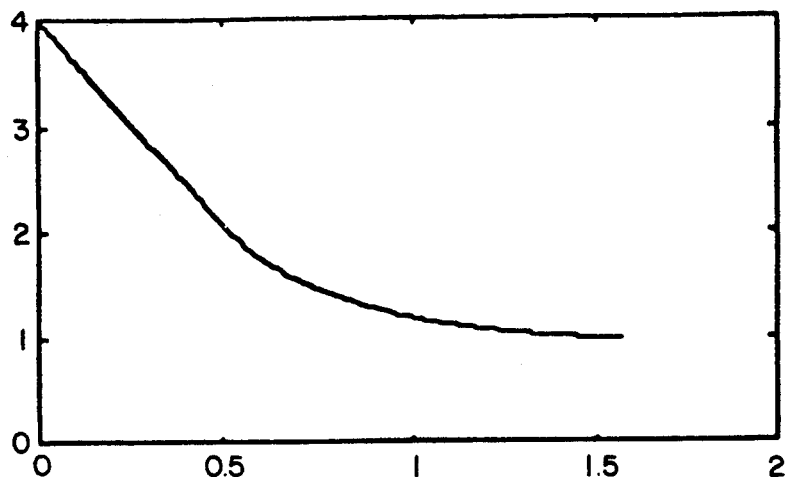
Figure 7:
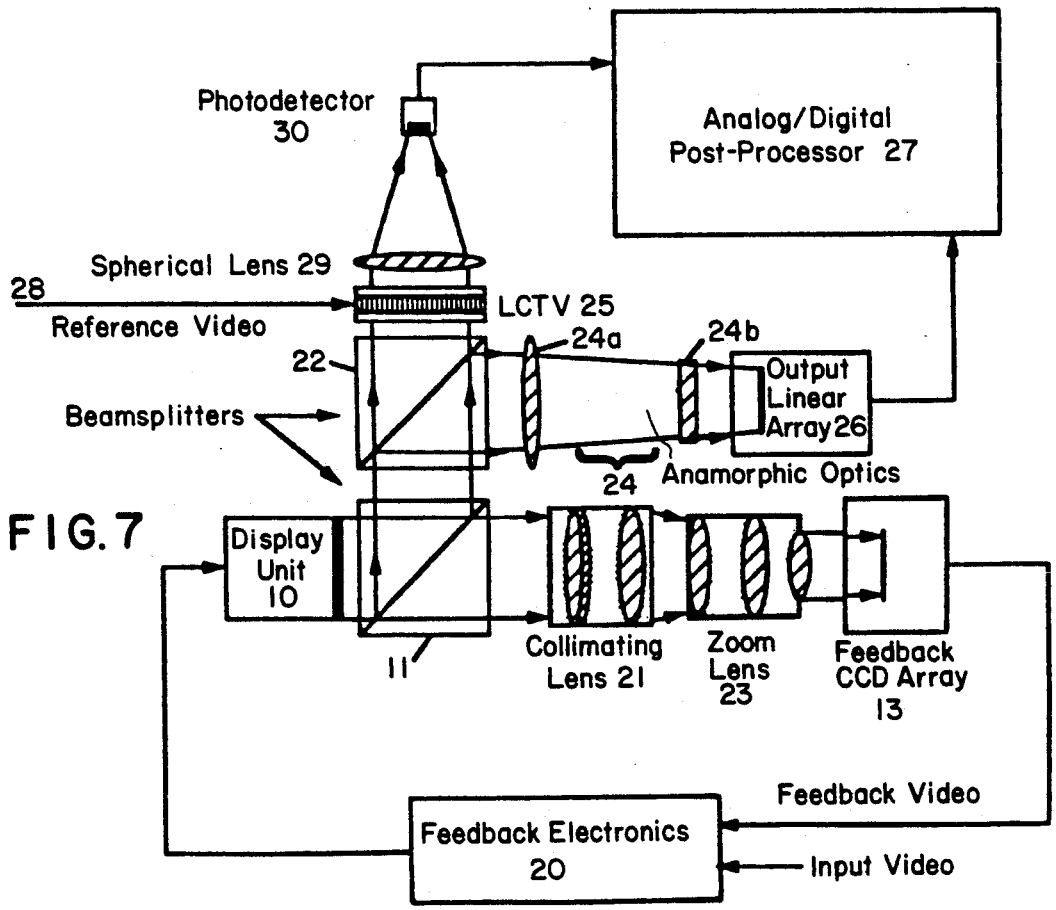
Figure 8:
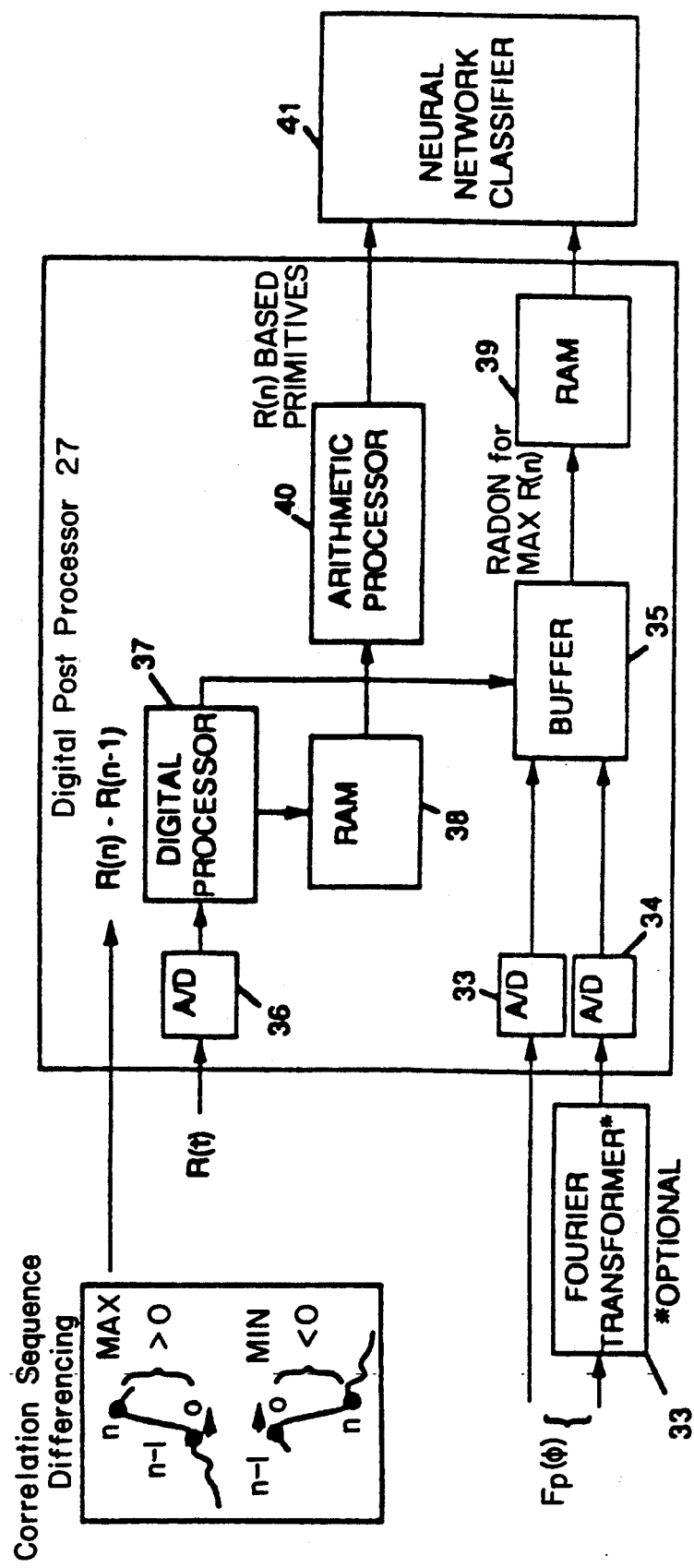
Figure 9:
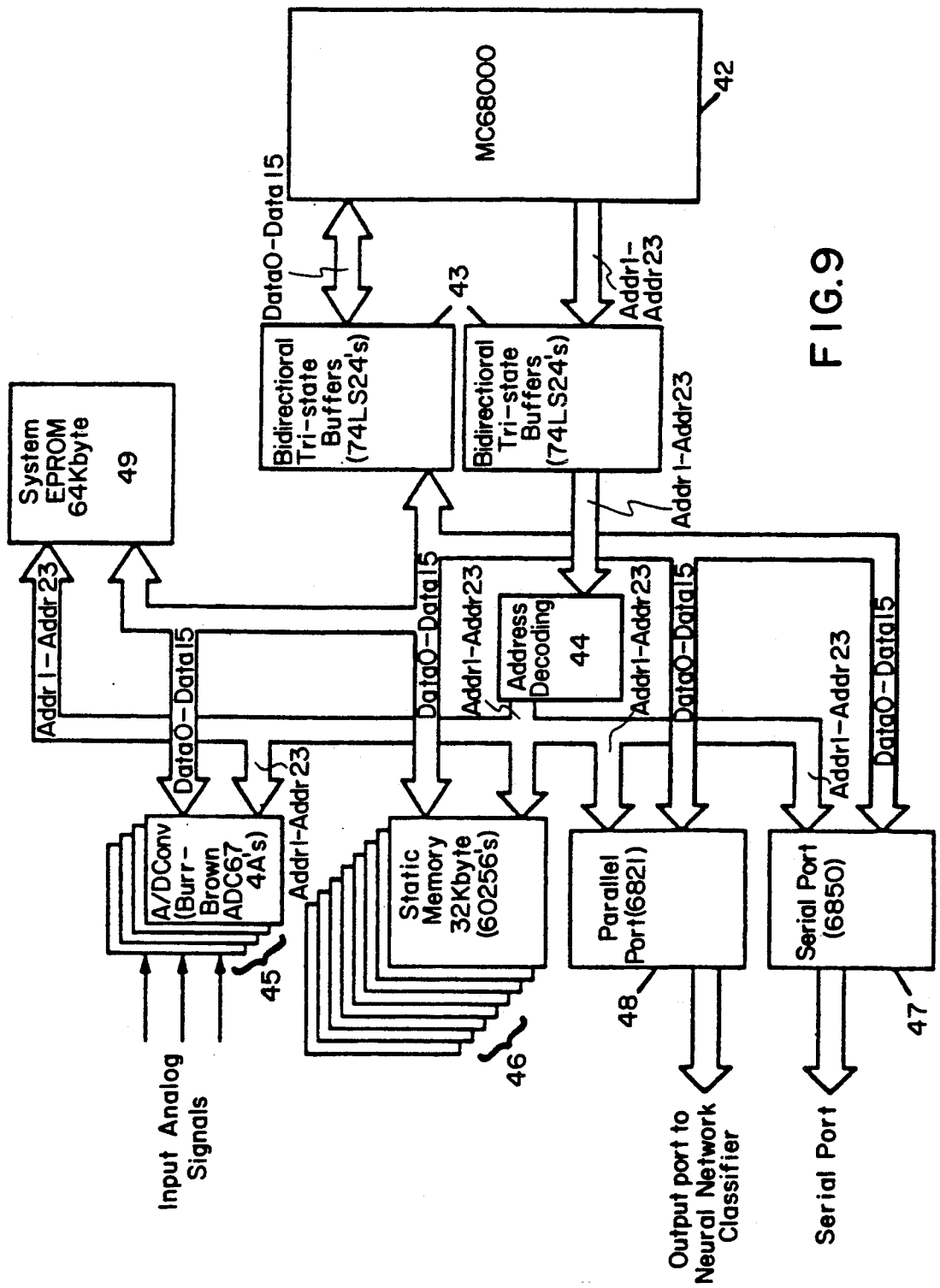
Figure 10:
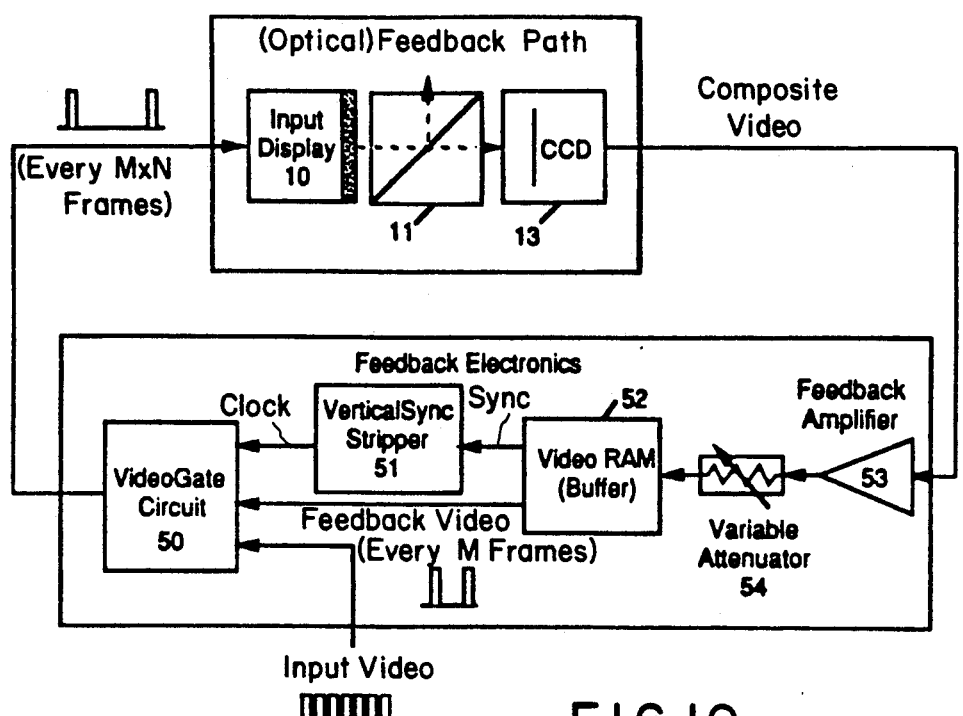
Figure 12:
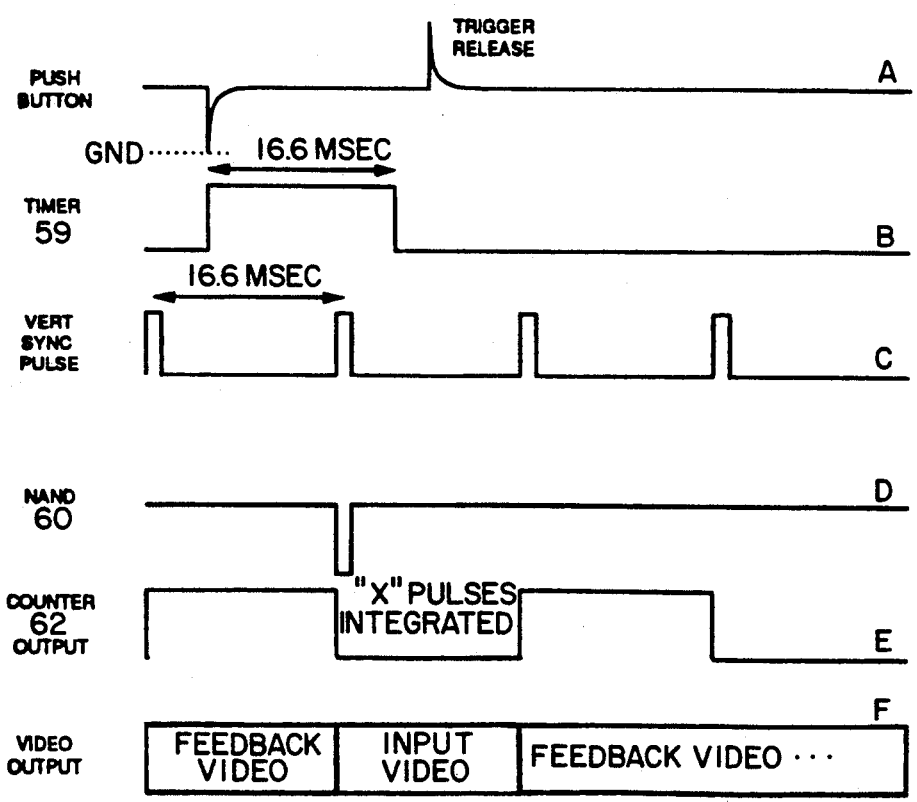
Figure 11:
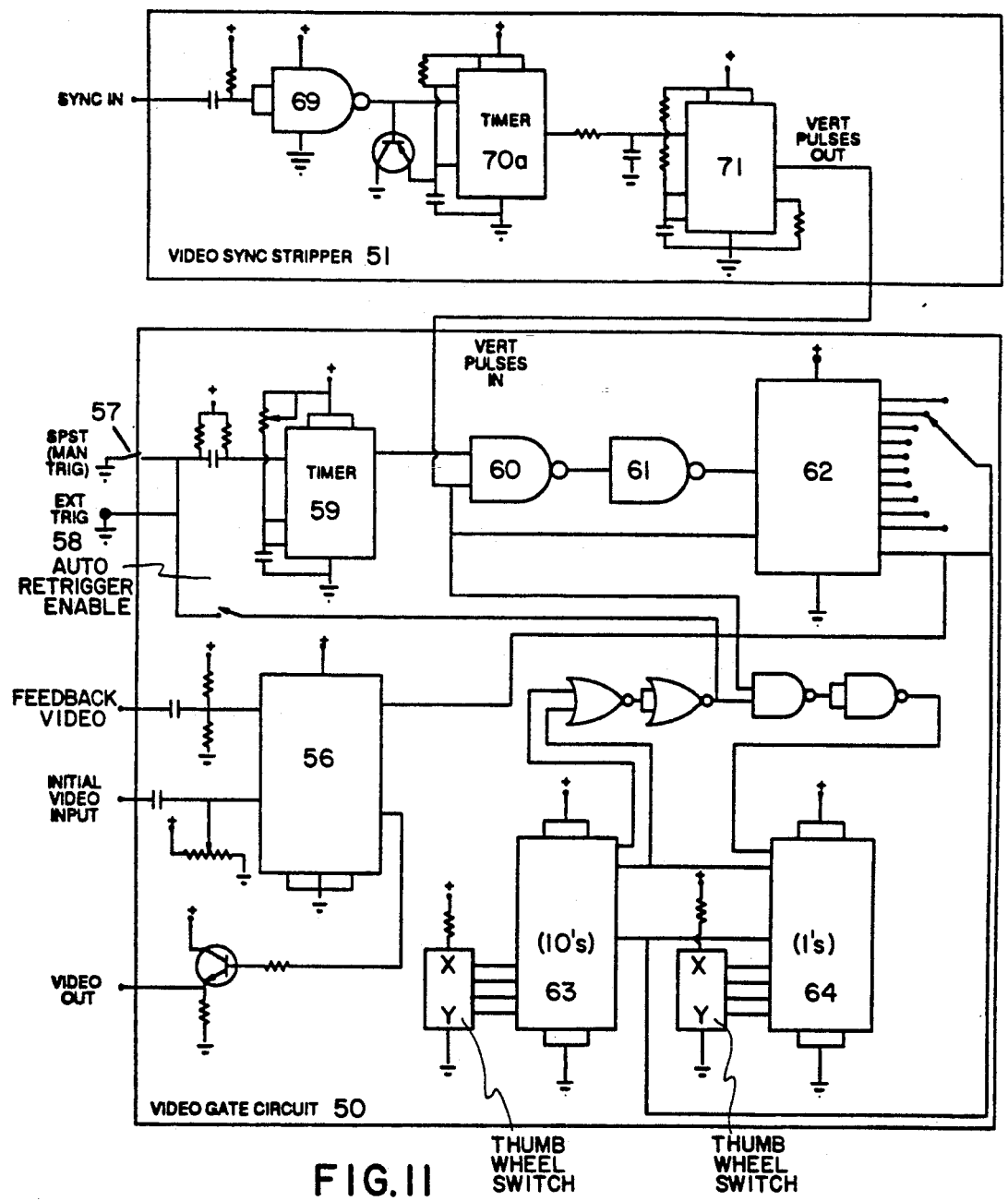

FIGS. 3a and 3b, respectively, are diagrammatic illustrations of typical Radon transform lens and angular correlation lens configurations;

FIGS. 4a and 4b, respectively, are isometric views of the Radon transforms of a simple rectangular object, for aspect ratios of 4:1 and 1:1 (i.e., square);

FIGS. 5a and 5b illustrate a simple rectangular object in two different angular correlation cases or conditions;

FIG. 6 illustrates the correlation function of the simple rectangular object resulting from rotation;

FIG. 7 is a block diagram of the proposed electro-optical processor of the present invention for performing Radon transformation and angular correlation of input images;

FIG. 8 is a functional block diagram of a digital post-processor employed in the proposed electro-optical processor;

FIG. 9 is a block diagram of one embodiment of the digital post processor shown in FIG. 8;

FIG. 10 is a block diagram of video feedback circuitry proposed in accordance with one embodiment of the present invention;

FIG. 11 is a detailed circuit diagram of the video sync stripper and video gate used in the embodiment of the video feedback circuitry shown in FIG. 10; and, FIG. 12 is a timing diagram for the video feedback circuitry shown in FIG. 10.

BRIEF DESCRIPTION OF VIDEO FEEDBACK LOOP

Figure 1:
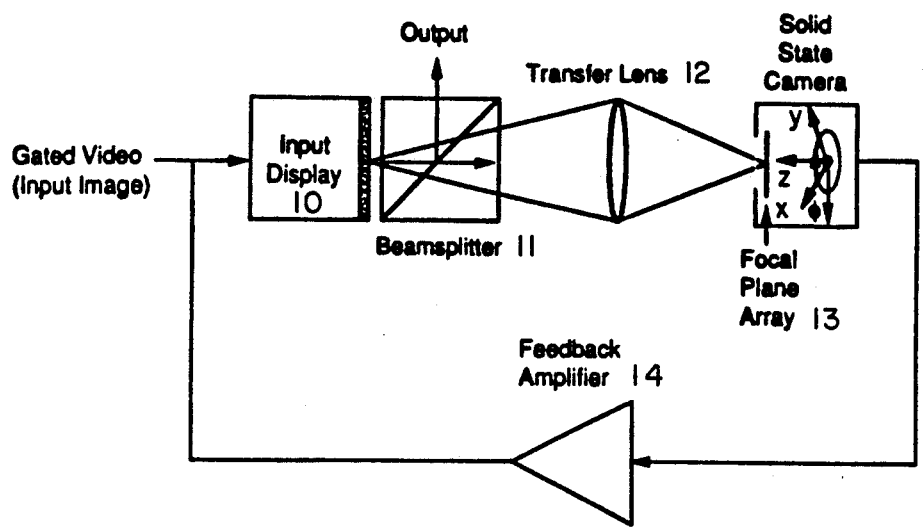
FIG. 1 is a block diagram of the basic feedback architecture proposed in accordance with the present invention.

The basic architecture for incorporating video feedback into the electro-optical processor of the present invention is shown in FIG. 1 of the accompanying drawings. In this architecture, a gated input image f(x,y) is projected into the architecture via an input display 10. The displayed image is then projected through a beam-splitter 11 and transfer lens 12 onto a focal plane array 13, which is rotated by a fixed angle $\phi$ with respect to the input image. Feedback is implemented using a feedback loop containing amplifier 14.

Before describing in detail the preferred embodiment of the present invention, it will be helpful to discuss, for the ideal mode of operation, the operations performed on the input image by the optical rotation processor underlying the present invention. More specifically, the transformation on the independent variables (image spatial coordinates x,y) is denoted by:

$$X' = RMx \tag{1}$$

where M is the magnification matrix:

$$M = \begin{bmatrix} M_{11} & M_{12} \\ M_{21} & M_{22} \end{bmatrix} \tag{2}$$

and R is the rotation matrix:

$$R = \begin{bmatrix} \cos\phi & \sin\phi \\ -\sin\phi & \cos\phi \end{bmatrix} \tag{3}$$

M allows for non-unity magnification, different in x and y coordinates (anamorphic optics), as well as image inversion. The transformation of the amplitude or intensity of the input image is given by:

$$I_{n+1}(x,y) = T[I_n(x',y')] \tag{4}$$

where the transmission operator T is, in general, non-linear versus input amplitude and non-uniform versus spatial coordinates (x,y). T also includes the linear transformation associated with the point spread function of the system. Consequently, the gain function in the feedback loop may have to be made inversely non-linear and non-uniform to compensate for T and, if necessary, compensate for resolution loss.

MATHEMATICAL ANALYSIS OF OUTPUT OPTICAL PROCESSORS

Figure 2:
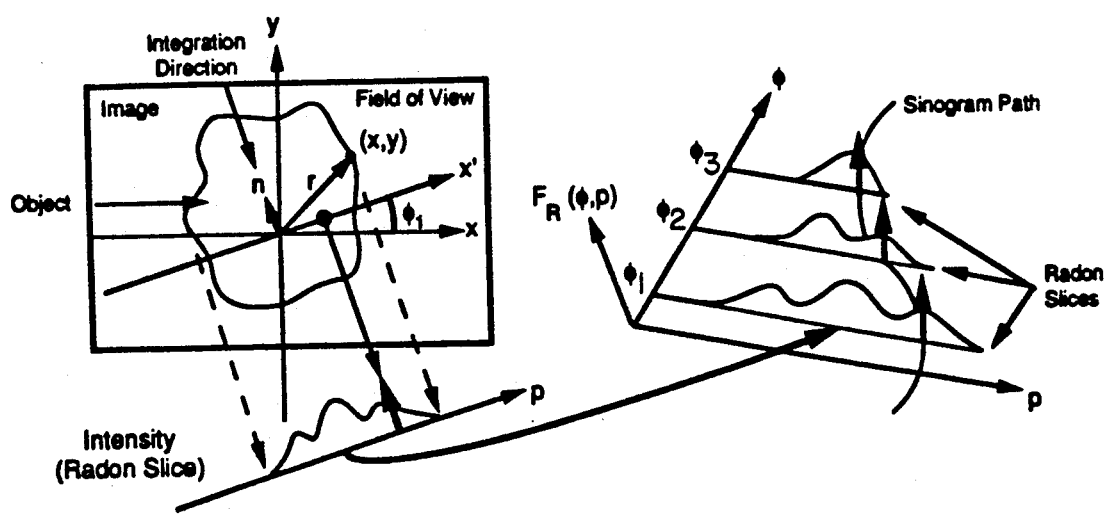
FIG. 2 is a generalized pictorial illustration of the Radon transform of an image being processed.

In the traditional (2-D) image processing situation, the Radon transform can be viewed as a collection of 1-D projections of a 2-D function f(x,y). A single projection along an angle $\phi$, as shown in FIG. 2, can be derived by integration along lines at $\phi + \pi/2$. The 1-D function thus generated has as its independent variable the perpendicular distance of the integration line from the origin, denoted by the magnitude of the vector $p = r \cdot n = r\cos(\theta - \phi)$ where $r = r\cos\phi i + r\sin\phi j$ and the unit vector n is defined as $n = \cos\phi i + \sin\phi j$. The composite of all such projections can be denoted by $F_R(p,\phi)$, implying a new 2-D function (or sequence of 1-D functions parametrized by $\phi$) has been created. The Radon transform can also be viewed as a 1-D integral transform in which the kernel is a 1-D Dirac delta function that selects the projection's angle $\phi$ for a given Radon slice, viz.:

$$F_R(p,\phi) = \int\int_\infty f(r)\delta(p - r \cdot n)d^2r \tag{5}$$

The new coordinates (p,$\phi$) constitute Radon space, and a plot of $F_R(p,\phi)$ is termed a sinogram, because a single point in Cartesian space maps to a sinusoid in Radon space.

An important theorem associated with the Radon transform is the projection-slice theorem, viz.:

$$FT_{2-D}[f(r)] = FT_{1-D}\{F_R[f(r)]\} \tag{6}$$

which states that the 2-D Fourier ($FT_{2-D}$) transform of a function f(x,y) can be obtained by first taking the Radon transform and then taking a 1-D Fourier transform ($FT_{1-D}$) on the projection data. Thus, one can get to 2-D Fourier space by two different routes. In pattern recognition, the 2-D Fourier transform is often desired, but the processing overhead for calculating it by brute-force is too great. The important consequence of the projection-slice theorem is that by calculating the Radon transform first and then using a 1-D Fourier transform, the computational burden for obtaining the 2-D Fourier transform can be reduced. Provided aliasing can be avoided, sparsely sampling in $\phi$ helps to achieve this. The choice of polar sampling depends upon what structural information is desired from the image, and if the object has a low rotational symmetry (e.g. a rectangle with large aspect ratio), the angular sampling interval may be quite large, e.g. 10–15 degrees.

A slice of the Radon transform at $\phi = \phi_o$ is given by:

$$F_R(p, \phi_o) = F_R\{f(x,y)\}|_{\phi=\phi_o} \tag{7}$$

$$= \int\int_{-\infty}^{\infty} f(x,y)\delta(p - x\cos\phi_0 - y\sin\phi_0)dxdy \tag{8}$$

The delta function "sifts out" of the integral the function f(x,y) (which describes the amplitude or intensity distribution of the input image) along the locus of points defined by $p = x\cos\phi_o + y\sin\phi_o$. This expression is equivalent to a 1-D Fourier transform evaluated at zero spatial frequency ($v=0$) along an axis perpendicular to the Fourier axis, when the space coordinates in f(x,y) are coordinate transformed by a rotation matrix R such that:

$$x' = R\, x \tag{9}$$

viz.:

$$F_1(x') = F_{1D}\{f(x',y')\}|_{v=0} \tag{10}$$

$$= \int_{-\infty}^{\infty} f(x',y')\exp(-j2\pi y v)dy|_{v=0} \tag{11}$$

The rotation transformation implicit in Eq. 11 is explicitly given by Eq. 3 which, therefore, can be used to solve for x':

$$x' = x\cos\phi_o + y\sin\phi_o = p \tag{12}$$

which indicates x' is identical to p as shown in Eq. 8.

An illustration of the optical components required to perform the Radon transform is given in FIG. 3(a). Note that one cylindrical lens is used to perform the Fourier transform along the y axis and the other cylindrical lens images along the x-axis provided the light is coherent. If incoherent light is used to generate the Radon transform, two cylindrical lenses are still required. They image with radically different magnifications in the x and y axes and are used to focus the object light distribution onto a common focal plane, as shown in FIG. 3(a). The lens spacing will be different than the coherent case, however, as discussed below. Along the x-axis, one of the lenses has refractive power so that an object is imaged without change of scale. Under these conditions:

$$1/f_c = 1/s_o + 1/s_i \tag{13}$$

where lateral magnification $= M = s_i/s_o = 1$, i.e. a unity magnification relay lens (although M<1 may be desired). In top view, the first cylindrical lens has no refractive power but the other (orthogonal) one does, hence $f_c = \infty$ along the y-axis and $f'_c$ is such that:

$$1/f'_c = 1/s'_i + 1/s'_o \tag{14}$$

where lateral magnification $= M' << 1$, i.e. a minifying relay lens. Thus, along the x-axis, the input image is transferred onto many pixels of the focal plane whereas, along the y-axis, it is compressed so as to fall entirely on one pixel.

As an example of the Radon transform of a simple object, consider an input image described as a rectangular aperture. Using Eq. 8 and the definition of the 2-D rectangle function, viz.:

$$f(x,y) = \text{rect}(x/x_o)\,\text{rect}(y/y_o) \tag{15}$$

the Radon transform is, for $0 \leq \phi < \tan^{-1}(x_o/y_o)$:

$$F(p,\phi) = \begin{cases} [p + (x_o\cos\phi + y_o\sin\phi)/2]\sec\phi\csc\phi & -(x_o\cos\phi + y_o\sin\phi)/2 \leq p \leq -(x_o\cos\phi - y_o\sin\phi)/2 \\ y_o/\cos\phi & -(x_o\cos\phi - y_o\sin\phi)/2 \leq p \leq (x_o\cos\phi - y_o\sin\phi)/2 \\ [-p + (x_o\cos\phi + y_o\sin\phi)/2]\sec\phi\csc\phi & (x_o\cos\phi - y_o\sin\phi)/2 \leq p \leq (x_o\cos\phi + y_o\sin\phi)/2 \end{cases}$$

for $\phi = \tan^{-1}(x_o/y_o)$:

$$F(p,\phi) = \begin{cases} [p + (x_o\cos\phi + y_o\sin\phi)/2]\sec\phi\csc\phi & -(x_o\cos\phi + y_o\sin\phi)/2 \leq p \leq 0 \\ [-p + (x_o\cos\phi + y_o\sin\phi)/2]\sec\phi\csc\phi & 0 \leq p \leq (x_o\cos\phi + y_o\sin\phi)/2 \end{cases} \tag{16}$$

and for $\tan^{-1}(x_o/y_o) < p \leq \pi/2$:

$$F(p,\phi) = \begin{cases} [p + (x_o\cos\phi + y_o\sin\phi)/2]\sec\phi\csc\phi & -(x_o\cos\phi + y_o\sin\phi)/2 \leq p \leq (x_o\cos\phi - y_o\sin\phi)/2 \\ x_o/\sin\phi & (x_o\cos\phi - y_o\sin\phi)/2 \leq p \leq -(x_o\cos\phi - y_o\sin\phi)/2 \\ [-p + (x_o\cos\phi + y_o\sin\phi)/2]\sec\phi\csc\phi & -(x_o\cos\phi - y_o\sin\phi)/2 \leq p \leq (x_o\cos\phi + y_o\sin\phi)/2 \end{cases}$$

which is plotted in FIGS. 4(a) and 4(b) in isometric view, for aspect ratios of 4:1 and 1:1 respectively. Notice that the 1:1 aspect ratio is an obvious intuitive result. This result can be obtained by using the rotation architecture illustrated in FIG. 1 with the appropriate (Radon transform) output lenses, as just described.

Although the example of a rectangular pillbox is not particularly interesting from a structural point of view, it is one of the few analytically tractable examples (in addition to the simple unit impulse array typically described). In fact, combining it with a unit impulse array serves as a simple model of a ship target. The rectangular function acts like a continuous low-level background contribution characteristic of the basic hullform, and the unit impulse array represents a collection of discrete scatterers characteristic of the superstructure. Of course, the discrete scatterers are of key interest in ship target recognition, particularly for the Radon transform slice corresponding to the longitudinal profile of the object. The underlying rectangular shape is also interesting as a model to illustrate how object primitive features can be extracted via correlation, as will be discussed below.

The angular correlation of the input image with a stored replica of itself can also be implemented optically using the basic feedback architecture described earlier and a simple spherical lens like that in FIG. 3(b) with a single photodetector in the focal plane. This configuration is appropriate for coherent light when the lens is in a Fourier transform configuration. In this case, a 2-D Fourier transform of the product of f(x,y) with f(x',y'), where $x' = R\, x$, is evaluated at $u = v = 0$ using the single detector. In this case:

$$F_2(x + x', y + y') = F_{2D}\{f(x,y)f(x',y')\}|_{u=v=0} \tag{17}$$

-continued $$= \int\int_{-\infty}^{\infty} f(x,y)f(x',y')\exp[-j2\pi(ux+vy)]dxdy|_{v=0} \quad (18)$$

$$F_2(x+x', y+y') = \int\int_{-\infty}^{\infty} f(x,y)f(x',y')dxdy \quad (19)$$

which is the definition for correlation, although the spatial shift occurs only in angle. Thus it makes better sense to treat equation (18) in polar coordinates. Then:

$$F_2(\phi) = F_2(r,\theta') \quad (20)$$

$$= \int_0^\infty \int_0^{2\pi} f(r,\theta)f'(r,\theta+\theta')\exp[-j2\pi rp\cos(\theta-\phi)]rdrd\theta|_{\rho=0} \quad (21)$$

$$F_2(\phi) = \int_0^\infty \int_0^{2\pi} f(r,\theta)f(r,\theta+\theta')rdrd\theta \quad (22)$$

If incoherent light is used, a simple spherical lens is still used, but in an imaging configuration that yields the same result as Eq. (22). It is important to note that in order to eliminate the errors in object primitive dimension estimates defined below, the sensed and reference images should be saturated (or binary-level) images against a black background. Otherwise intensity variations internal to the object boundaries will corrupt the desired measurements.

As a simple example of angular correlation, consider the correlation of a rectangular object with itself as illustrated in FIGS. 5(a) and 5(b). There are two regimes to treat in solving this instructive example. Case 1 illustrated in FIG. 5(a) is where the area of overlap is a parallelogram, and case 2 illustrated in FIG. 5(b) is where the area of overlap is a nonregular octagon. For case 1, the correlation function is given by:

$$R(\phi) = y_o^2 \csc\phi \quad (23)$$

where $y_o$ is the object width. This expression is valid for $\phi > \phi_{MIN}$ where:

$$\phi_{MIN} = 2\tan^{-1}(y_o/x_o) \quad (24I)$$

For case 2, the correlation function is given by:

$$R(\phi) = x_o y_o - \sec\phi\tan\phi/2(x_o^2+y_o^2+2x_o y_o\sin\phi)/2 \quad (25)$$

where $x_o$ is the object length and $1$ and $0 \leq \phi \leq \phi_{MIN}$. Plots of $R(\phi)$ for an object with aspect ratios $x_o/y_o = 4$ are shown in FIG. 6. From this plot, a number of primitive but key features can be estimated, as summarized in the following table.

TABLE 1

| Object Primitives | | |
|---|---|---|
| Primitive Feature: | Mathematical Expression: | Comment: |
| Object Width | $y_o = [R(\phi = \pi/2)]^{\frac{1}{2}}$ | Minimum Correlation |
| Object Area | $x_o y_o = R(\phi = 0)$ | Maximum Correlation |
| Object Length | $x_o = R(\phi = 0)/[R(\phi = \pi/2)]^{\frac{1}{2}}$ | (Max:Min$^{\frac{1}{2}}$) Ratio |
| Object Aspect | $x_o/y_o = R(\phi = 0)/R(\phi = \pi/2/)$ | (Max:Min) |

TABLE 1-continued

| Object Primitives | | |
|---|---|---|
| Primitive Feature: | Mathematical Expression: | Comment: |
| Ratio | | Ratio |

Finally, object orientation can be deduced from the angle that the reference object must be rotated to bring it into alignment with the sensed object and for which $R(\phi)$ is a maximum. These primitive measures of the object remain reasonably accurate and meaningful even when the object is not an exact rectangle (e.g.: when irregular, elliptical or hull-shaped).

In addition, by selecting a simple (i.e., slit) function as the reference image, angular cross-correlation will result, which will yield not only the object orientation but the object boundary as well. (This assumes that the object in the sensed image is simply-connected, centered by an automatic tracking system in the field-of-view, and saturated in intensity, as described earlier.

PREFERRED EMBODIMENT

The preferred embodiment of this invention has several major optical, analog and digital components, shown in FIGS. 7-12. Referring first to FIG. 7, input video from a camera (or video/cassette recorder which simulates the sensor) is routed to the input display unit 10 through feedback electronics 20. The feedback electronics circuitry 20, shown in detail in FIGS. 10 and 11, will be described later, but its basic function is to allow only one frame (or field) of video to be displayed on the display unit 10, and to allow subsequent fields (or frames) to be delayed and feedback for a fixed period of time. Following this, the beamsplitter 11 divides the input beam, transmitting 50% of the light onto a collimating lens 21 and reflecting the other 50% of the light onto a second beamsplitter 22. The light that propagates through the first beamsplitter 11 to the collimating lens 21 continues through a zoom lens 23 onto the feedback CCD focal plane array 13, which is rotated about the optical axis by a small fixed angle (nominally 6°-12°). This essentially rotates the input image by the corresponding amount. The zoom lens 23 allows for variation of the scale of the input or feedback image. The zoom setting is nominally set to yield unity lateral magnification. The output of the feedback CCD array 13 is then routed through video feedback electronics 20 which serves several additional purposes, including: compensation for the 3 db loss in beamsplitter 11, compensation for image retention and nonlinearity in the CCD array 13 or display unit 10, and triggering and clocking of the input video gate, all to be described hereinafter. The video feedback output of the feedback electronics 20 is also displayed on the display unit 10, and appears rotated by 6°-12°, whereupon it undergoes a 50/50 split; one-half reflecting back into the feedback loop for the next iteration, and one-half propagating through to the second beamsplitter 22. At the second beamsplitter 22, 50% of the light reflects to Radon transform optics 24 and the other 50% propagates through to a liquid crystal television (LCTV) 25 for angular correlation. As discussed earlier in connection with FIG. 3a, the Radon transform optics consist of two cylindrical lenses 24a and 24b separated from the output linear detector array 26 by image distances required to image with nominal minification of 10:1 in the (vertical) y-axis and approximately 40:1 in the (horizontal) x-axis. As a result of the minification in the y-axis the image falls entirely onto the large aspect ratio (100:1) detector elements on the linear array 26, where light integration is thus achieved in that axis, as desired. Subsequently, the linear array 26 detects the Radon transform slice corresponding to the initial angle (and successive rotation angles). The linear array output is then fed to the analog/digital post processor 27. The rotating image that transmits through the LCTV 25 is spatially modulated by the fixed (non-rotated) reference image displayed on the LCTV from the input at 28. For angular correlation only, a spherical lens 29 is utilized to focus the light onto a single detector 30 (as was shown in FIG. 3(b)), whose output also goes to the post processor 27.

The top-level diagram for the post processor 27, as shown in FIG. 8, describes the numerical processing steps required to prepare the optically extracted features for pattern recognition in a neural network classifier 31. The Radon transform values obtained from the output linear array 26 can be directly digitized, at A/D converter 32, and Fourier transformed using a charge transfer device 33 before digitization at A/D converter 34. They are then stored in a buffer 35. The angular correlation values, on the other hand, are digitized at A/D converter 36 and a first-order forward difference (see inset to FIG. 8) is taken in the digital processor 37. By this procedure, the maximum R(0) and minimum R($\pi$/2) correlation values can be determined These results are stored in RAM 38. When the peak value of the angular correlation (MaxR(n)) is determined in the digital processor 37, it is used to trigger the release of the Radon transform from the buffer 35. This Radon transform corresponds to the longitudinal profile of the object in the original input scene. This profile is held in RAM 39 until computations in the arithmetic processor 40 are completed. The arithmetic processor calculates the primitives described hereinabove in Table 1.

In addition, by comparing the angle for the reference image with the angle required to bring the input image into maximum correlation with it (or with a simple slit aperture, as described previously), the orientation of the object in the field of view can be determined. These primitives and samples along the longitudinal profile are passed simultaneously to the neural network processor 41 for classification.

A detailed hardware block diagram for the digital post processor 27 is shown in FIG. 9. For the sake of simplicity, however, the FIG. 9 block diagram does not show the control lines to the different devices or the logic used for address decoding and device selection. These will be obvious to one of ordinary skill in the art, based upon the disclosure contained herein.

The post processor 27 is a single board microcomputer based on the Motorola MC68000 microprocessor 42. The MC68000 is a 16/32 bit microprocessor with a data path that is 16-bits wide externally and 32-bits wide internally. Although the data bus on the MC68000 is 16 bits wide, it can read or write 8 bits. This allows the processor to access 8 bit registers located on odd addresses. The address bus is 24 bits wide and can address up to 16 megabytes of memory. Control lines are provided for interfacing to memory and input/output devices. Eight prioritized interrupt lines (not shown) can be used to signal the processor when the Radon samples or the peak correlation values need to be read from the A/D converter (to be described later). The MC68000 is a well-established processor with software development tools readily available.

As shown in FIG. 9, the data and address buses are buffered using tri-state buffers 43, because as more components are interfaced to the microprocessor bus, the bus signals attenuate and the signal levels may not be distinguishable between high and low states. The address bus then goes to decoders 44 which will select the memory and input/output devices. All the devices shown (such as A/D converters 45, static memory 46, and serial and parallel ports 47 and 48) are memory-mapped so that the selection of a device can be accomplished through software (by reading or writing to a particular address). The software to perform the post processor operations is stored in the nonvolatile Erasable Programmable Read Only Memory (EPROM) 49.

The A/D converters 45 are used to digitize the Radon samples and peak correlation values. In practice, the Burr Brown ADC674A converter was selected and is a microprocessor-compatible 12 bit A/D converter with a conversion rate of 15 microseconds per sample. Digitizing the Radon samples from a 1024 element linear detector requires a conversion rate of 30.72 kilosamples per second since the entire detector array is scanned at frame rates (1/30th of a second). The angular correlation values from the single element photodetector are read at frame rates and require a conversion rate of 30 samples per second. The Radon samples and the angular correlation values are both 8 bits wide. The conversion rate and resolution of the ADC674A A/D converter (15 microseconds per 12 bit sample), is sufficient to convert the angular correlation values and the Radon samples.

The static memory 46 of the post processor 27 consists of eight 32 kilobyte memory chips with an access time of 100 nanoseconds. In order to store all the Radon samples and the peak correlation values, 128 kilobytes are required. The total memory size is 256 kilobytes allowing storage of additional Radon samples and angular correlation values.

As illustrated in FIG. 9, a parallel port or peripheral interface adaptor (PIA) 48 is used to transfer data to the neural network classifier 41. Each PIA occupies four memory addresses. Two memory locations are for the two 8-bit parallel ports, and the remaining two are for registers controlling each port. Outputting data through the PIA involves setting the appropriate bits in the control registers of the PIA and writing the output data to the PIA's data registers. Finally, a general purpose serial port 47 is provided to communicate with external devices.

To facilitate the operation of the video feedback architecture proposed in accordance with the present invention, feedback electronics are provided as shown functionally in FIG. 10. The video gate circuit 50 allows up to 9 fields of input video to pass to the input display 10 every MxN frames, clocked by the vertical sync stripper 51. This gate 50 is triggered every 1 (minimum) to 99 (maximum) fields (typically 15-60 fields). A video RAM or buffer 52 holds the feedback video for N frames (where N=1 to 4, usually) before releasing it to the display unit 10. Sync output from the RAM 52 is provided to the sync stripper 51, which sends a signal to clock the video gate circuit 50 to gate at the field (or frame) rate. The composite video signal feedback to the video RAM 52 is amplified by a fixed gain amplifier 53 and is adjusted in contrast by use of a precision attenuator 54. The purpose of the video RAM 52 is to delay the feedback image from the CCD 13 before it is displayed. The video RAM 52 can also implement a nonlinear transfer characteristic to compensate for any nonlinearity in the display unit 10 or CCD 13.

The video gate circuit 50 is designed to do several major functions. More specifically, it is designed to change its output from one video signal to another in the vertical interval, when a display would not show the change. This gives the display time to react to the new image and also gives a full image in the first field of video. It is also designed so that the user can select the number of fields of video under test, to display, and it can also be triggered manually or externally, by grounding an external trigger output. If desired, the circuit can also be made to retrigger itself automatically. Finally, the circuit 50 is designed to pass the video through with little or no degradation.

The video gate circuit 50 is shown in detail in FIG. 11 and has two composite video signals (denoted as "initial" and "feedback") feeding into it continuously and one composite video output. Each video input is AC coupled to an analog multiplexer/demultiplexer circuit 56 through a voltage divider network which is used for transistor biasing on the output of circuit 56. To trigger the gate circuit 50, a SPST momentary switch 57 is provided as well as connection 58 to an external trigger such as a computer output. These trigger inputs, clamped to a preselected DC voltage, are AC coupled through a capacitor to a timer circuit 59.

Referring now to the timing diagram of FIG. 12, the AC coupling circuitry to the timer 59, along with the additional resistor shown in FIG. 11, forms a high pass filter, which only allows a short pulse (A) to trigger the timer 59 so that it is not accidentally retriggered if the switch 57 is held down too long. The period (B) of timer 59 is slightly shorter than the vertical sync pulse period (C), so that the pulse from timer 59 will be coincident in time with only one vertical sync pulse, thus ensuring correct reset counting of the analog multiplexer/demultiplexer circuit 56. The pulse from the timer 59 and the vertical sync pulses go to a NAND gate 60 in FIG. 11. Only when both pulses are coincident in time does the gate 60 have an output (D) in FIG. 12. This output pulse, after being inverted at 61, resets a counter 62 and lets it start counting, as represented at (E) in FIG. 12. The counter 62 counts the vertical pulses coming from the sync stripper portion 51 of the circuitry shown in FIG. 11. As soon as the counter 62 is reset, its lowermost output pin goes low and switches the output of the analog mux/demux circuit 56 to the test (input) video, see (F) in FIG. 12. Then, when the counter 62 counts to the number of fields set, its lowermost output pin goes high, and the analog mux/demux 56 is switched back to the feedback video.

The auto-retrigger portion of the video gate circuit 50 shown in FIG. 11 consists of two programmable decade up/down counters 63 and 64 that are set-up to count down the number of video fields set by the associated thumbwheel switches 65 and 66. The counters 63 and 64 are reset when the counter 62 starts to count, and they start counting when the counter 62 stops counting and the feedback video starts. When both counters 63 and 64 reach zero, the "borrow" pins on both counters go low, which stops the counting. When the auto-retrigger enable switch 67 is on, the video gate circuit 50 is retriggered to let a new segment of input video through.

Composite sync (input at 68) is AC coupled to the video sync stripper circuit 63. After being inverted at 69, the composite sync is applied to a missing pulse detector circuit 70. The RC time constant of the timer circuit 70a thereof times this detector to slightly longer than the horizontal sync rate; thus, the output from the timer 70a is constantly being reset by horizontal sync. At the vertical interval, however, there are no horizontal sync pulses to reset the timing circuit 70a, so a pulse is output to a second timer 71, which is timed to output a pulse which is approximately the same length as a vertical sync pulse, and coincident in time.

In addition to the preferred embodiment described hereinabove, several components of the basic architecture can readily be changed to yield other embodiments that perform the Radon transform and angular correlation, as well as correlation with respect to scale. Moreover, in addition to displaying input video via a conventional television, it can also be displayed via a liquid crystal TV (LCTV), in which case it is trans-illuminated by a laser beam. Input image display may also be implemented by using a liquid crystal light valve, in which input light can be incoherent. Coherent light (using a laser) can be used within the architecture for readout and feedback. Input light can also be input directly by telescopic optics when viewing real scenes. The displayed image can then be projected onto a CCD focal plane array, as described previously, or onto a charge injection device (CID) or vidicon camera for subsequent feedback.

Basically, the video feedback loop discussed above as comprising a significant feature of the present invention, is essentially an optical-to-optical transducer with gain. Another way to implement feedback gain would be to use a microchannel plate intensifier (set to approximately 3 dB gain). Any spectral mismatch between input (photocathode) and output (phosphor) can be compensated by a spectrally matching filter. If the optics in this part of the architecture are set-up to rotate the image, then it would be termed a recursive rotation architecture, as already described. If the optics, however, were also configured to magnify or minify the input image, then the architecture would be termed a recursive zoom architecture, and it would thus be useful in optical image matching to adjust for scale mismatch. Finally, in lieu of the linear detector array (26 in FIG. 7) after the output Radon optics, an acousto-optic (Bragg) cell can be used to calculate the Fourier transform of the resulting profile. Alternatively, the linear detector array output can be input into a CCD, SAW or digital chip for calculating the Fourier transform, if desired.

Various other modifications, alterations and adaptations will be obvious to persons of ordinary skill in the art from the above teachings. Therefore, it should be clearly understood that, within the scope of the appended claims, the present invention may be practiced otherwise than as specifically described hereinabove.

What we claim is:

1. An optical processing method comprising the steps of:
   inputting video images to a image display means at predetermined gated on time intervals to produce corresponding optical images,
   coupling the optical images from said image display means to an optical-to-video camera means whose output video images are rotated by a preselected angle ($\phi$) relative to the corresponding optical images from said image display means,
   feeding back each rotated video image for display on said image display means prior to the time at which the next input video image is gated on to the image display means, routing the optical images produced by said image display means to an output image processing means, and performing selected processing of said input images.

2. The optical processing method specified in claim 1, wherein the step of coupling the optical images from said image display means includes passing said optical images through a collimating-zoom lens combination and onto a solid state array positioned at the output focal plane of said lens combination.

3. The optical processing method specified in claim 1, wherein the steps of coupling and routing the optical images from said image display means to said camera means and said output image processing means respectively are performed by a beamsplitter positioned at the output of said image display means.

4. The optical processing method specified in claim 1, wherein the step of performing optical image processing comprises selectively performing the Radon transformation and/or angular correlation of said input images.

5. The optical processing method specified in claim 4 further including the selective steps of routing the optical images from said image display means through anamorphic optics onto an output linear array to derive the Radon transformation of said input images and/or routing the optical images from said image display means along with a reference image to a transmissive spatial light modulator whose output is applied through a spherical lens to a photodetector, for detecting the focused output of the spherical lens representing the value of angular correlation between the optical and reference images for a predetermined angle of rotation.

6. The optical processing method specified in claim 5 further including the step of applying the outputs of the linear array and photodetector to a microprocessor-based digital processor to compute selected object characteristics based on angular correlation values and to select a longitudinal Radon profile based on a maximum angular correlation value.

7. An optical processor system comprising, in combination:
an image display means for converting input video images into corresponding optical output images,
a source of input video images connected to said image display means,
a camera means optically connected to convert optical images from said image display means into corresponding output video images rotated by a preselected angle ($\phi$) relative to said optical images,
means for feeding back the output video images from said camera means to the input of said image display means, and
means for selectively processing the optical output images from said image display means to derive the Radon transformation of the input video images and/or perform angular correlation of said input video images.

8. The optical processor system specified in claim 7, wherein input video images are on-off gated to said image display means at predetermined time intervals and the feedback video images are applied to said image display means during the time interval when input video images are gated off.

9. The optical processor system specified in claim 7 further including feedback amplifier means connected between said camera means and said image display means for amplifying said feedback video images.

10. The optical processor system specified in claim 9 wherein said feedback amplifier means has a gain factor to compensate for optical losses, and further including an adjustable delay means to eliminate image retention.

11. The optical processor system specified in claim 7 further including a beamsplitter operably connected to the output of said image display means for coupling the optical output images from said image display means to said camera means and said processing means.

12. The optical processor system specified in claim 11 further including a collimating-zoom lens combination interposed between said beamsplitter and said camera means.

13. The optical processor system specified in claim 12 wherein said camera means is positioned at the output focal plane of said lens combination.

14. The optical processor system specified in claim 11 wherein said processing means includes a linear array means and an anamorphic optics means coupling the output of said beamsplitter means to said linear array to derive the Radon transform of said input images.

15. The optical processor system specified in claim 14 wherein said anamorphic optics means comprises a pair of orthogonally oriented cylindrical lenses for imaging in one axis with 10:1 minification and for imaging with minification of approximately 2:1 in the orthogonal axis, and wherein said linear array is a self-scanned detector array oriented along an axis parallel to the 10:1 minification axis of said lenses for readout of the Radon transform.

16. The processor system specified in claim 11 wherein said processing means includes
a photodetector means,
a spatial light modulator connected optically to receive the output of said beamsplitter means,
a source of reference video images applied to said spatial light modulator, and
a spherical lens positioned optically between the output of said spatial light modulator and said photodetector means and producing an optical output representing the angular correlation between said reference images and the optical output images from said display means for selected angles of rotation of said reference image.

17. The optical processor system specified in claim 16 wherein said processing means further includes
a linear array means,
an anamorphic optics means coupling the output of said beamsplitter means to said linear array means to derive the Radon transform of said input images, and
means for simultaneously coupling the optical output from said beamsplitter means to said anamorphic optics means and said spatial light modulator.

18. The optical processor system specified in claim 17 wherein said simultaneous coupling means is a second beamsplitter.

19. The optical processor system specified in claim 17 wherein said processing means is a microprocessor-based digital processor means connected to receive the outputs of said photodetector and said linear array means to compute selected object characteristics based on angular correlation values detected and select a longitudinal Radon profile based on the maximum angular correlation value.

20. The optical processor system specified in claim 19 further including analog to digital converter means operably connecting the outputs of said photodetector and said linear array means to said microprocessor-based digital processor means.

* * * * *